United States Patent
Pfanner et al.

(10) Patent No.: US 10,492,558 B2
(45) Date of Patent: Dec. 3, 2019

(54) PROTECTIVE GLASSES FOR FITTING ON A PROTECTIVE HELMET, AND PROTECTIVE HELMET PROVIDED WITH THE PROTECTIVE GLASSES

(71) Applicant: PFANNER SCHUTZBEKLEIDUNG GMBH, Koblach (AT)

(72) Inventors: Anton Pfanner, Hohenems (AT); Martin Greber, Götzis (AT)

(73) Assignee: PFANNER SCHUTZBEKLEIDUNG GMBH, Koblach (AT)

( * ) Notice: Subject to any disclaimer, the term of this patent is extended or adjusted under 35 U.S.C. 154(b) by 487 days.

(21) Appl. No.: 15/031,934

(22) PCT Filed: Oct. 15, 2014

(86) PCT No.: PCT/EP2014/072158
§ 371 (c)(1),
(2) Date: Apr. 25, 2016

(87) PCT Pub. No.: WO2015/059014
PCT Pub. Date: Apr. 30, 2015

(65) Prior Publication Data
US 2016/0286889 A1  Oct. 6, 2016

(30) Foreign Application Priority Data
Oct. 24, 2013 (DE) .......................... 10 2013 017 830

(51) Int. Cl.
*A42B 3/18*  (2006.01)
(52) U.S. Cl.
CPC .................... *A42B 3/185* (2013.01)
(58) Field of Classification Search
CPC .... G02C 3/02; G02C 5/2263; G02C 2200/18; G02C 5/20; G02C 5/143; A42B 3/185;
(Continued)

(56) References Cited

U.S. PATENT DOCUMENTS

| | | | | |
|---|---|---|---|---|
| 860,322 | A | * | 7/1907 | Paroubek .............. A42B 1/247 2/10 |
| 1,832,747 | A | * | 11/1931 | Spoljarich ............. A42B 3/185 2/10 |

(Continued)

FOREIGN PATENT DOCUMENTS

| | | |
|---|---|---|
| DE | 689 09 934 T2 | 4/1994 |
| DE | 20 2004 008 860 U1 | 8/2004 |

(Continued)

OTHER PUBLICATIONS

International Search Report in PCT/EP2014/072158 dated Jan. 12, 2015, English Translation provided.

(Continued)

*Primary Examiner* — Jameson D Collier
*Assistant Examiner* — Jocelyn Bravo
(74) *Attorney, Agent, or Firm* — Hassan Abbas Shakir; Shakir Law PLLC

(57) ABSTRACT

Protective glasses include a curved lens panel for protecting the eyes. Two side pieces have an inner end articulated on a helmet and an outer end articulated on the lens panel. The glasses are pivotable from a protective position to a stowed position. Each side piece includes a glasses arm and a glasses-carrying arm. The glasses arms are curved in the direction of the lens panel and adjoin the lens panel tangentially. The glasses arms have axes of articulation that are not aligned with one another. In the stowed position, the protective glasses are in a helmet and can be moved into, and out of, the stowed position using one hand, without length of the side pieces or tilt of the lens panel in relation to the side pieces being changed. One-handed actuation of the glasses is very advantageous in forestry work, in the industrial sector or for climbing purposes.

16 Claims, 13 Drawing Sheets

(58) Field of Classification Search
CPC ........... A42B 3/0406; A42B 3/30; A42B 3/04;
A42B 3/42; A42B 3/223; A42B 1/247
USPC ........ 2/424, 10, 15, 6.3, 426, 427, 431, 448,
2/453, 454
See application file for complete search history.

(56) References Cited

U.S. PATENT DOCUMENTS

| | | | | |
|---|---|---|---|---|
| 2,237,639 | A * | 4/1941 | Spoljarich | A42B 3/185 2/10 |
| 3,548,411 | A * | 12/1970 | Barstow | A42B 3/042 2/6.5 |
| 3,781,915 | A * | 1/1974 | Menold | A42B 3/185 2/10 |
| 3,787,641 | A | 1/1974 | Santori | |
| 4,322,138 | A * | 3/1982 | Minart | A42B 3/04 351/133 |
| 5,129,102 | A * | 7/1992 | Solo | A42B 1/247 2/10 |
| 5,278,999 | A * | 1/1994 | Brown | A61F 9/025 2/10 |
| 5,289,592 | A * | 3/1994 | Paivarinta | A61F 9/025 2/431 |
| 5,752,280 | A * | 5/1998 | Hill | A42B 3/185 2/453 |
| 6,104,816 | A | 8/2000 | Downs, Jr. et al. | |
| 6,611,959 | B1 * | 9/2003 | Lando | A42B 3/185 2/10 |
| 6,892,393 | B1 * | 5/2005 | Provost | A42B 3/185 2/10 |
| 7,325,920 | B1 * | 2/2008 | Gelfuso | A42B 1/247 2/10 |
| 8,286,269 | B2 * | 10/2012 | Springer | A42B 3/185 2/10 |
| 9,049,896 | B2 * | 6/2015 | Huh | A42B 3/185 |
| 9,345,282 | B2 * | 5/2016 | Durocher | A42B 3/324 |
| 2004/0051015 | A1 * | 3/2004 | Ohrling | A47B 96/065 248/214 |
| 2006/0185051 | A1 * | 8/2006 | Teston | A42B 3/185 2/6.3 |
| 2006/0236438 | A1 * | 10/2006 | Rogers | F41H 1/04 2/6.7 |
| 2008/0172775 | A1 * | 7/2008 | Higgins | A42B 3/185 2/422 |
| 2009/0235437 | A1 * | 9/2009 | Springer | A42B 3/185 2/422 |
| 2010/0154093 | A1 * | 6/2010 | Provost | A42B 3/185 2/10 |
| 2010/0223706 | A1 | 9/2010 | Becker et al. | |
| 2012/0084084 | A1 | 4/2012 | Zhu et al. | |
| 2012/0185989 | A1 * | 7/2012 | Higgins | A42B 3/185 2/15 |
| 2013/0047310 | A1 | 2/2013 | Peebles | |
| 2013/0139288 | A1 * | 6/2013 | Gisquiere | A42B 3/185 2/10 |
| 2013/0318673 | A1 * | 12/2013 | Huh | A42B 3/0406 2/10 |

FOREIGN PATENT DOCUMENTS

| | | |
|---|---|---|
| EP | 0 519 621 A1 | 12/1992 |
| EP | 0 618 751 A1 | 10/1994 |
| EP | 2292112 A1 | 3/2011 |
| EP | 1853129 B1 | 12/2011 |
| JP | 2004-173018 A | 6/2004 |

OTHER PUBLICATIONS

Written Opinion in PCT/EP2014/072158 posted Apr. 30, 2015 to WIPO Patentscope, Partial Machine Translation provided.
Nritten Opinion in PCT/EP2014/072158 by the European Patent Office posted Apr. 30, 2015 to WIPO Patent Scope, official English Translation provided.
German Office Action dated Dec. 18, 2015 issued by the German Patent & Trademark Office for the Corresponding German Patent Application No. 10 2013 017 830.4, partial machine translation provided.
International Preliminary Report on Patentability Chapter I dated Apr. 26, 2016 issued by the International Bureau of WIPO, official English Translation provided.
German Office Action dated Aug. 8, 2014 issued by the German Patent Office for the corresponding German Patent Application No. 10 2013 017 830.4, partial machine translation provided.

* cited by examiner

PROTECTIVE GLASSES FOR FITTING ON A PROTECTIVE HELMET, AND PROTECTIVE HELMET PROVIDED WITH THE PROTECTIVE GLASSES

BACKGROUND OF THE INVENTION

1. Field of the Invention

The invention is directed to protective glasses for fitting on a protective helmet and a helmet with protective glasses. More particularly, the invention is directed to an elongate, at least longitudinally curved lens panel for protecting the eyes, having two side pieces, each of which can have, or have, an inner end articulated on the helmet and a helmet with such protective glasses.

2. Discussion of the Related Art

Protective glasses of the type mentioned herein are known from U.S. Pat. No. 6,892,393 B1. The known protective glasses, instead of having a frame with two side pieces and two lenses fitted into the frame, have a continuous lens panel, which replaces the frame and the two lenses. On the side adjacent to the head, the lens panel has two angled portions, which are essentially parallel to one another, at its outer ends. Each of the two side pieces have their outer or distal end articulated in a latchable manner on said two angled portions. Each of the two side pieces have their inner or proximal end articulated on a plug. The plugs can be introduced into slots formed in the lower periphery of a protective helmet. If eye protection is not required, the lens panel is tilted upward, about its points of articulation on the side pieces, out of a protective position, located in front of the eyes of a person wearing the helmet, into a stowage position. During this tilting operation, the two side pieces change neither in position nor in length. The outer ends of the two side pieces are provided with annular bearings, in which two hubs formed on the lens panel are mounted such that they can be rotated about their articulation axes. The arrangement here is such that the two articulation axes are aligned with one another. Each annular bearing is provided with axial grooves in the 12 o'clock, 9 o'clock and 10.30 positions, so that the lens panel is held in position when it has been pivoted or tilted into a lower position (0°), an intermediate position (75°) or an all-the-way-up position (90°). Latching here in each case is soft latching, that is to say latching which can easily be disengaged by virtue of the lens panel being pivoted or tilted by hand. Provision is therefore also made, as an alternative to the aforementioned latching of the lens panel on the two side pieces, for a friction fit, which allows stepless angle adjustment of the lens panel. In the stowage position, the lens panel, when viewed from the side, has approximately only up to a third of its extent penetrating into the space enclosed by the protective helmet, while the rest of the lens panel remains visible beneath the protective helmet. In this stowage position, the person wearing the protective helmet can easily see in the forward direction beneath the lens panel. If the protective helmet is used for forestry work, it is conceivable for branches to catch on the protective glasses when the lens panel is in this stowage position, and this carries the risk of the protective helmet being torn off the wearer's head.

In the case of another known pair of protective glasses, known from EP 1 853 129 B1, this risk is somewhat smaller because there is a change in the length of the side pieces of the glasses when the lens panel is moved into, and out of, the stowage position. This appears to make it possible to shift the stowage position further into the helmet. For this purpose, the two arms of each side piece are connected to one another by an intermediate articulation. Shortening of the length of the side pieces as the lens panel is being moved upward has the advantage that the lens panel, in its stowage position, is fully enclosed by the helmet. However, in the stowage position of the lens panel, the two side pieces project beyond the lower periphery of the helmet and can thus be caught by branches. Although the lens panel can be moved into the stowage position using one hand, both hands are required for moving the lens panel back into the protective position. This is problematic both in industry and for forestry work, because the person wearing the helmet, following a period during which the lens panel is located in the stowage position, is usually already holding the tool in one hand, and therefore he only has the other hand free for moving the lens panel back into the protective position. During this movement back, it is necessary not just for the two arms of each side piece to be pivoted at its intermediate articulation; in addition, it is also necessary for the lens panel to be pivoted about its articulation axes on the side pieces, in order to reset a certain tilting position of the lens panel in relation to the glasses arms. However, this is not readily achievable using one hand. The stowage of the lens panel or of the protective glasses per se does not usually pose any problems, because the person wearing the protective helmet has sufficient time here, because he is not in the process of working. However, when he begins to work, for example to saw, again, he has the saw in one hand and uses the other hand to try and move the lens panel as quickly as possible into the protective position, since it is important to re-establish protection quickly. This is barely achievable, however, using one hand.

SUMMARY OF THE INVENTION

It is an object of the invention to design protective glasses of the type mentioned below so as to avoid the problems outlined above. The intention is also to create a protective helmet provided with the protective glasses.

The invention relates to protective glasses for fitting on a protective helmet, having an elongate, at least longitudinally curved lens panel for protecting the eyes, having two side pieces, each of which can have, or have, an inner end articulated on the helmet and have an outer end articulated in a latchable manner on the lens panel, and therefore the lens panel can be moved upward out of a protective position, located in front of the eyes of a person wearing the helmet, into a stowage position, wherein each side piece has a glasses arm and a glasses-carrying arm, which can be displaced telescopically one inside the other for the purpose of changing the length of the side piece, and can be prevented from mutual displacement by a form fit and/or a friction fit.

This object is achieved according to the invention, proceeding from protective glasses of the type mentioned in the introduction, in that the lens panel is curved continuously in the longitudinal direction, in that the glasses arms are angled in the direction of the lens panel at outer ends of the side pieces, and therefore they are oriented essentially in a manner corresponding to the curvature of the lens panel and follow the lens panel tangentially, in that the glasses arms have articulation axes, which are not aligned with one another, and in that the side pieces can be hard-latched to the lens panel in a form-fitting manner in a number of selectable positions.

According to the invention, it is thus possible for the protective glasses as a whole to be stowed in a helmet, wherein this stowage operation can be effected quickly and reliably using one hand, and wherein a tilting position of the lens panel which is present prior to the stowage operation, that is to say in the protective position, is also available again following this single-handed operation. The pivoting angle of the lens panel in relation to the side pieces (this is the so-called tilting position) is usually set with the protective glasses mounted on the protective helmet, when the protective helmet has not yet been positioned on the head. The tilting position, once set, is maintained during movement of the lens panel, and more precisely of the protective glasses as a whole, into, and out of, the stowage position by virtue of the hard latching, that is to say the tilting position, in contrast to the two known pairs of protective glasses described above, does not change during this operation. In the case of the protective glasses according to U.S. Pat. No. 6,892,393 B1, already mentioned above, the tilting position, once set, has to be changed, because only the lens panel can be moved into the stowage position, and this can be done only by tilting in relation to the side pieces. In the case of the protective glasses known from EP 1 853 129 B1, likewise already mentioned above, the tilting position, once set, inevitably changes when the protective glasses are stowed, because the lens panel is connected to the helmet via three articulations at each end and the angle setting at each articulation changes in a stepless and completely free manner during movement of the lens panel into, and out of, the stowage position and during the resulting shortening in the length of the side pieces. In contrast, it is possible for the person wearing the helmet to push the protective glasses according to the invention into the stowage position using one hand, without this resulting in any change in length of the side pieces, because the hard latching between the lens panel and side pieces prevents any change in the tilting position of the lens panel during this operation.

The wording "can be hard-latched in a form-fitting manner" used to define the invention is intended to mean form-fitting latching which yields elastically when force is applied, that is to say, in addition to requiring friction to be overcome, also requires a bending operation in addition. In other words, force has to be applied so that the form-fitting latching yields elastically, that is to say the form fit is disengaged in an elastically yielding manner. The hard latching ensures that, during the operation of moving the protective glasses into, and out of, the stowage position, there is no change in the tilting position of the lens panel in relation to the side pieces. As already mentioned, this tilting position, in the case of the protective glasses according to the invention, is set beforehand with the helmet removed, first of all on the one side and then on the other side, the protective glasses being mounted, and being able to remain mounted, on the helmet.

The invention also provides a protective helmet having such protective glasses according to the invention. A protective helmet with which it is possible to combine the protective glasses according to the invention is known, for example, from DE 10 2010 027 012 A1, which is attributed to the applicant itself.

In one configuration of the protective glasses according to the invention, the lens panel is curved in circular-arc form in the longitudinal direction. This makes it easier for the side pieces to be connected to the lens panel such that it is possible for a desired tilting position to be set between the lens panel and the side pieces and then to be maintained when the protective glasses are being used.

In a further configuration of the protective glasses according to the invention, each of the glasses arms are angled inward, at their points of articulation on the lens panel, by an angle of 30° to 35° in relation to a tangent in each case to the point of articulation. This also makes it easier to set, and to maintain, a desired tilting position.

In a further configuration of the protective glasses according to the invention, the lens panel has formed on it, adjacent to each of the articulation axes of the side pieces, a protrusion, which can be latched in a form-fitting and elastic manner to an adjacent ring of depressions, said ring being formed on each glasses arm. This makes it easier to achieve, and maintain, a desired tilting position.

In a further configuration of the protective glasses according to the invention, each ring has at least three depressions. This therefore gives rise to the lens panel having three possible tilting positions in relation to the side pieces. The person wearing the helmet thus has just three possible tilting positions available, which can be set "blind" and are maintained as long as there is no desire to change the tilting position. The lens panel can therefore be moved up and down using one hand without the lens panel adjusting in relation to the side pieces, that is to say without the tilting position changing during this operation. The side pieces thus accompany the movement of the lens panel without the tilting position changing.

In a further configuration of the protective glasses according to the invention, the side pieces are recessed by an amount equal to a thickness of the lens panel in a region around their articulation axes and at least as far as the ring of depressions. As a result, the inner side of the glasses arms essentially follows the curvature of the outer side of the lens panel, with the exception of the amount by which the glasses arms are angled.

In a further configuration of the protective glasses according to the invention, the side pieces are provided, at each of their inner ends, with a stub, by means of which the side pieces can be articulated on the helmet and can be latched in a friction-fitting or form-fitting manner at least in the stowage position of the glasses. The friction-fitting or form-fitting latching is expediently selected here such that it is significantly softer than the hard latching between the lens panel and side pieces, and therefore is significantly easier to disengage than the latter. This ensures that the protective glasses can be moved into, and out of, the stowage position without any change in the tilting position and cannot accidentally leave the stowage position again.

In a further configuration of the protective glasses according to the invention, the glasses-carrying arm of each side piece has a longitudinal groove, which forms a dovetail guide for the glasses arm of the side piece. This ensures that, during the operation of setting the tilting position, each side piece can be inherently twisted, that is to say about its longitudinal axis, without the glasses arm and the glasses-carrying arm becoming detached from one another or changing their position relative to one another in some other way.

In a further configuration of the protective glasses according to the invention, the longitudinal groove of each glasses-carrying arm is open in a direction transverse to the longitudinal direction of said arm. This makes it easier for each side piece to be inherently twisted, that is to say about its longitudinal axis.

In a further configuration of the protective glasses according to the invention, each glasses arm consists of an elastically flexible material and has a cross-sectionally flat U profile, which is open in the direction of the other side piece. This improves the guidance of each glasses arm in the glasses-carrying arm assigned to it.

In a further configuration of the protective glasses according to the invention, the ring of depressions is formed in a rib, which is integrally formed on the glasses arm and, in the region of each point of articulation, connects two U limbs of the flat U profile to one another. This also ensures that inherent twisting of the side piece, that is to say about its longitudinal axis, does not give rise to a change in the tilting position.

In a further configuration of the protective glasses according to the invention, the glasses arms can be arrested in a form-fitting and elastic manner on the glasses-carrying arms in defined longitudinal positions. This ensures, even more reliably, that the side pieces do not change in length when the protective glasses are moved into, and out of, the stowage position.

In a further configuration of the protective glasses according to the invention, in a bridge region of the lens panel, a rest for the bridge of the nose and/or the sides of the nose is fitted on the lens panel. This ensures that the protective glasses do not cause the person wearing the protective helmet any pain in any tilting position of the lens panel.

In a further configuration of the protective glasses according to the invention, the two side pieces are of mirror-inverted design. This makes it easier to produce, and to store, the protective glasses according to the invention.

In one configuration of the protective helmet according to the invention, said helmet is characterized by a helmet shell and an interior arrangement, which bound between them, at least in the front region of the helmet, a space into which the protective glasses can be swung upward for stowage purposes. This ensures that, in the stowage position, the protective glasses as a whole, that is to say including the side pieces thereof, are enclosed by the helmet.

In a further configuration of the protective helmet according to the invention, a headband of the interior arrangement is provided with openings for the articulation of the side pieces of the protective glasses, wherein the position of the openings is selected such that the protective glasses can be moved into, and out of, the stowage position without the length of the side pieces being changed. A further advantage of this configuration is that, when the interior arrangement is being adapted to the size of a helmet-wearer's head, the protective glasses are simultaneously set appropriately to the head size.

BRIEF DESCRIPTION OF THE DRAWINGS

Exemplary embodiments of the invention will be described in more detail hereinbelow with reference to the drawings, in which.

DETAILED DESCRIPTION OF THE INVENTION

Figure 1:
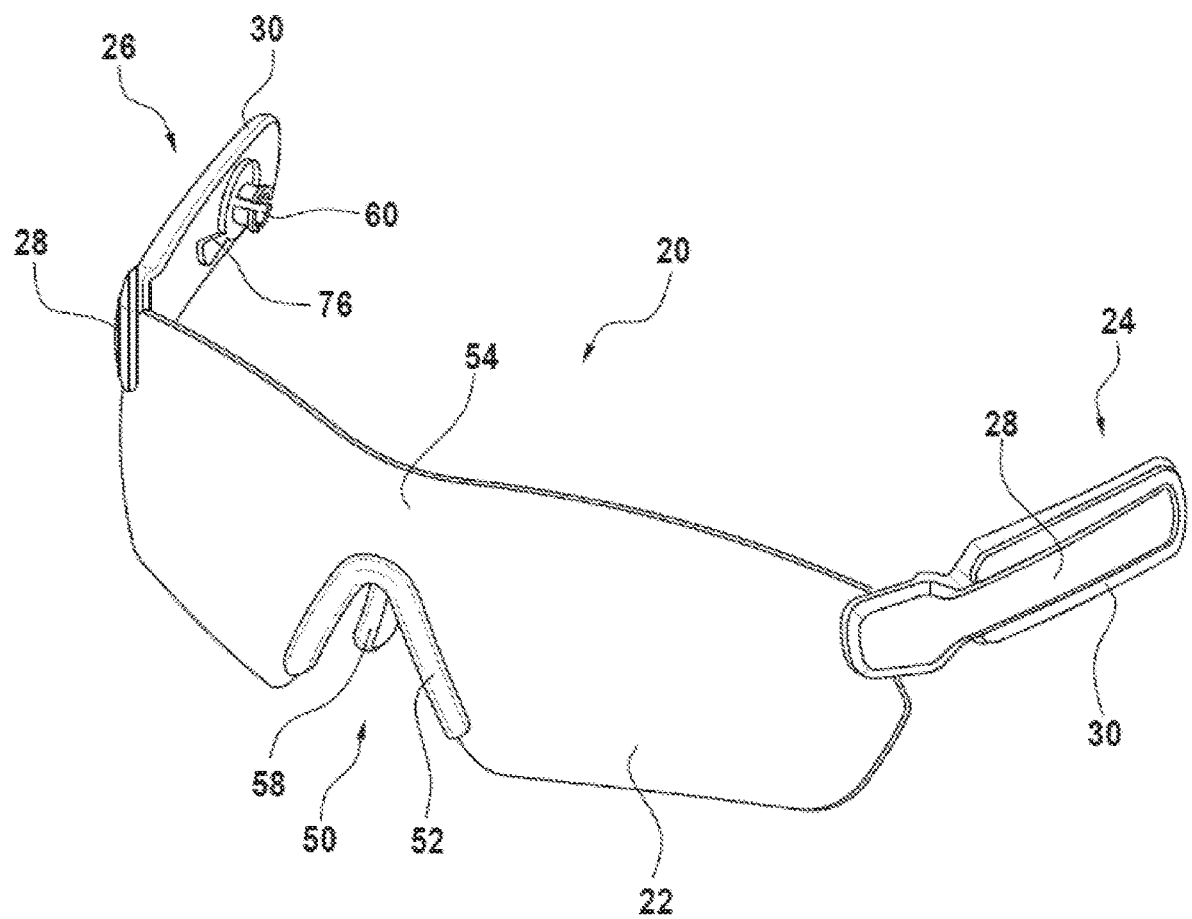
FIG. 1 shows a perspective illustration, as seen obliquely from above, of a preferred embodiment of protective glasses according to the invention.
Figure 2:
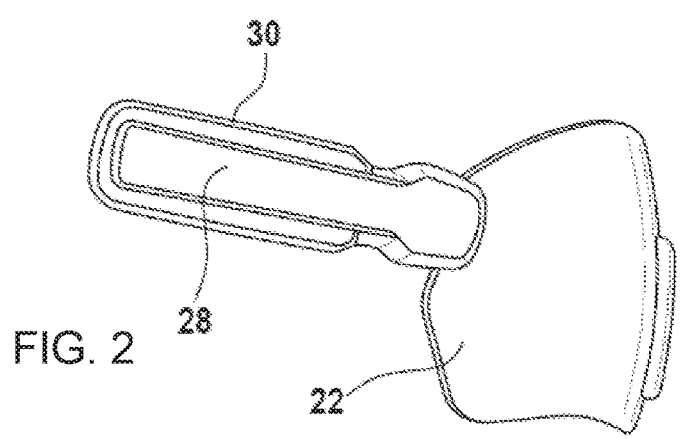
FIG. 2 shows the protective glasses according to FIG. 1 as seen from the left.

A preferred embodiment of protective glasses according to the invention is shown in FIG. 1, as seen obliquely from above, and is designated as a whole by 20. The protective glasses 20 are intended for fitting on a protective helmet 70, which is shown in FIGS. 9 to 13, which will be discussed in more detail hereinbelow. The protective glasses 20 comprise an elongate, at least longitudinally continuously curved lens panel 22 for protecting the eyes. In the case of the preferred embodiment of the protective glasses 20 illustrated, the lens panel 22 is also curved continuously in the transverse direction. In the embodiment illustrated, the lens panel 22 consists of colorless, clear plastics material, e.g. polycarbonate. It meets all the requirements which have to be met in accordance with the standard EN 166 in respect of personal eye protection. The lens panel 22 could also be designed in the form of a UV filter in accordance with EN 170 or in the form of a sunglare filter for industrial use in accordance with EN 172. In the embodiment illustrated, the protective glasses protect, in particular, against various levels of impact, optical radiation, spillages and splashing, dust and gases, but also against all kinds of particles, as arise, for example, when metal or stone is machined.

Figure 12:
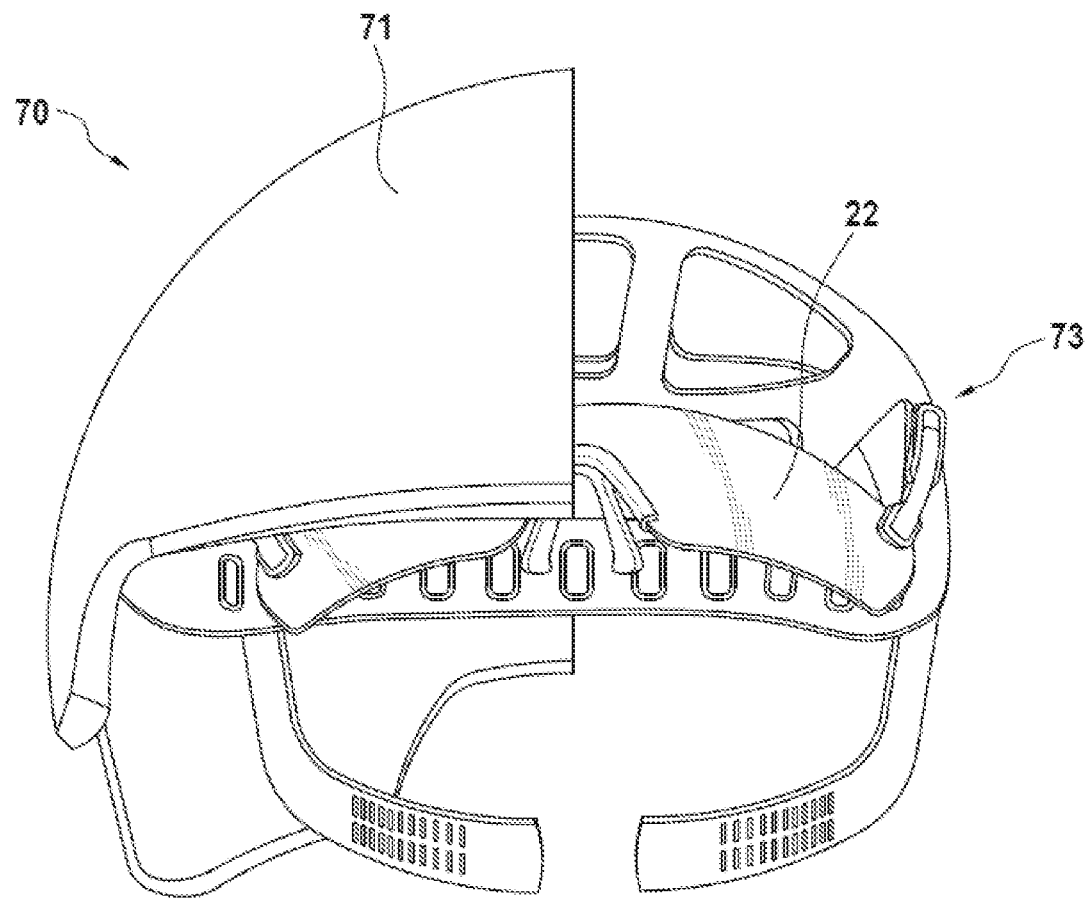
FIG. 12 shows the protective helmet according to the invention in the same view as in FIG. 9, although the protective glasses according to the invention are shown with their lens panel swung upward into a stowage position.
Figure 13:
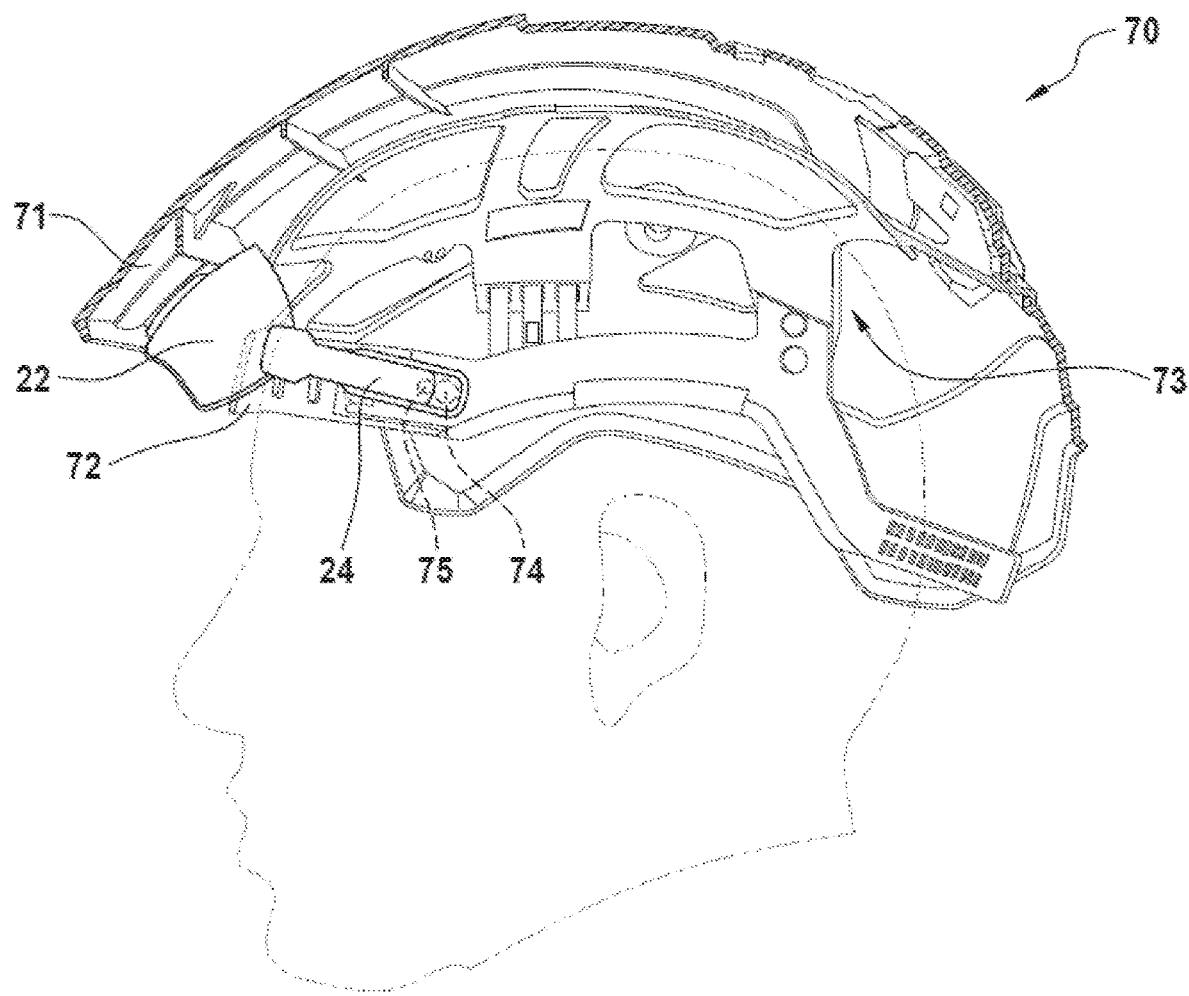
FIG. 13 shows the protective helmet according to FIG. 12 as seen from the right.

The protective glasses 20 also comprise two side pieces, which are designated as a whole by 24 and 26. The side pieces 24, 26 can respectively have an inner or proximal end, which is the end opposite the lens panel 22, articulated in a latchable manner on the helmet 70 and an outer or distal end, which is the end adjacent to the lens panel 22, articulated in a latchable manner on the lens panel. The lens panel 22 can thus be moved upward out of a protective position, located in front of the eyes of a person wearing the helmet and shown in FIGS. 9 to 11, into a stowage position, which is shown in FIGS. 12 and 13. The side pieces 24, 26 can be moved into one position or the other by way of the lens panel 22, and it is therefore the case that the protective glasses as a whole have a stowage position and a protective position.

Each side piece 24, 26 comprises a glasses arm 28 and a glasses-carrying arm 30, which can be displaced telescopically one inside the other for the purpose of changing the length of the side pieces 24, 26. The side pieces 24, 26 are of mirror-inverted design, for which reason the individual parts of the side pieces 24, 26 are provided with the same reference signs in the drawings.

Figure 3:
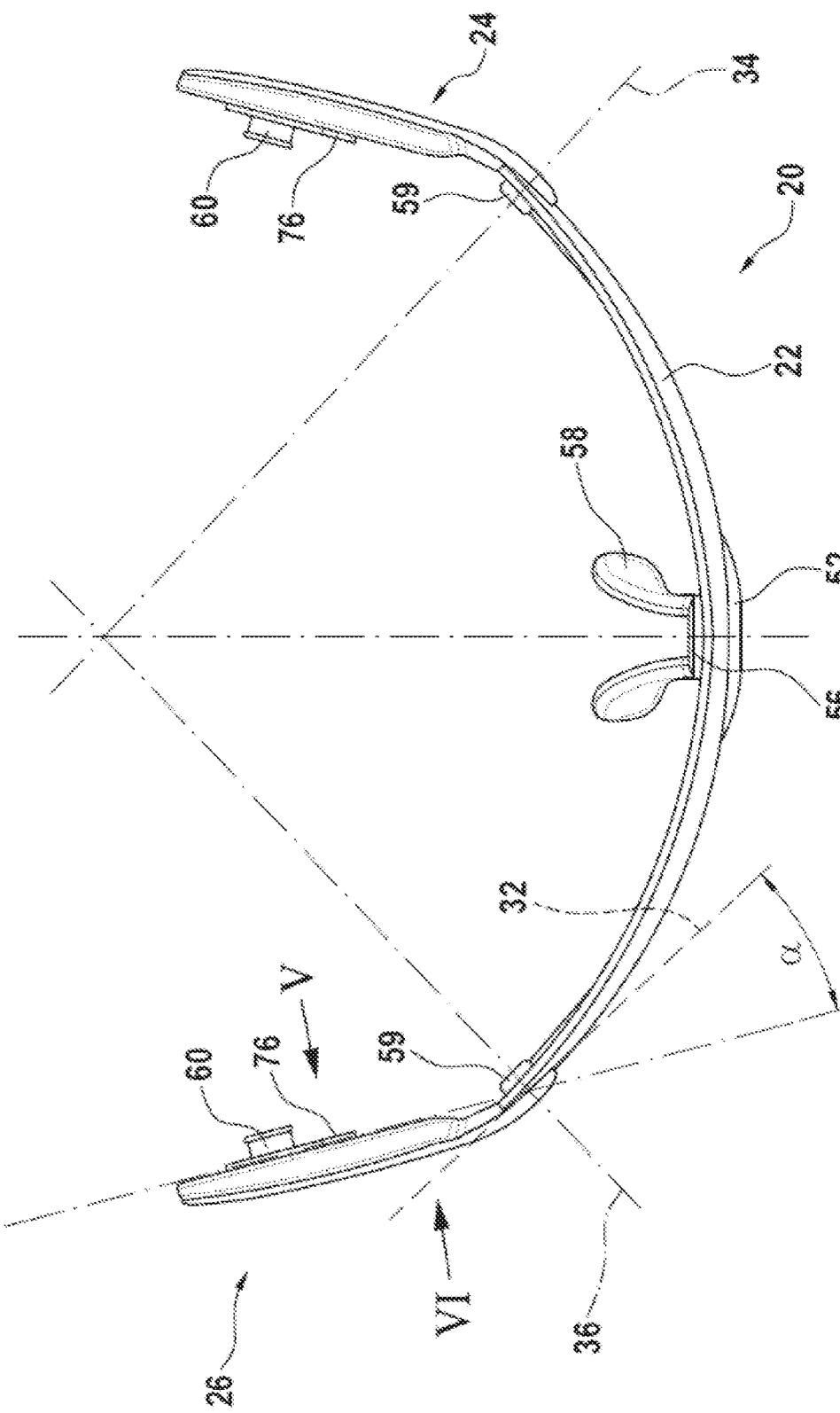
FIG. 3 shows a plan view of the protective glasses according to FIG. 1.
Figure 4:
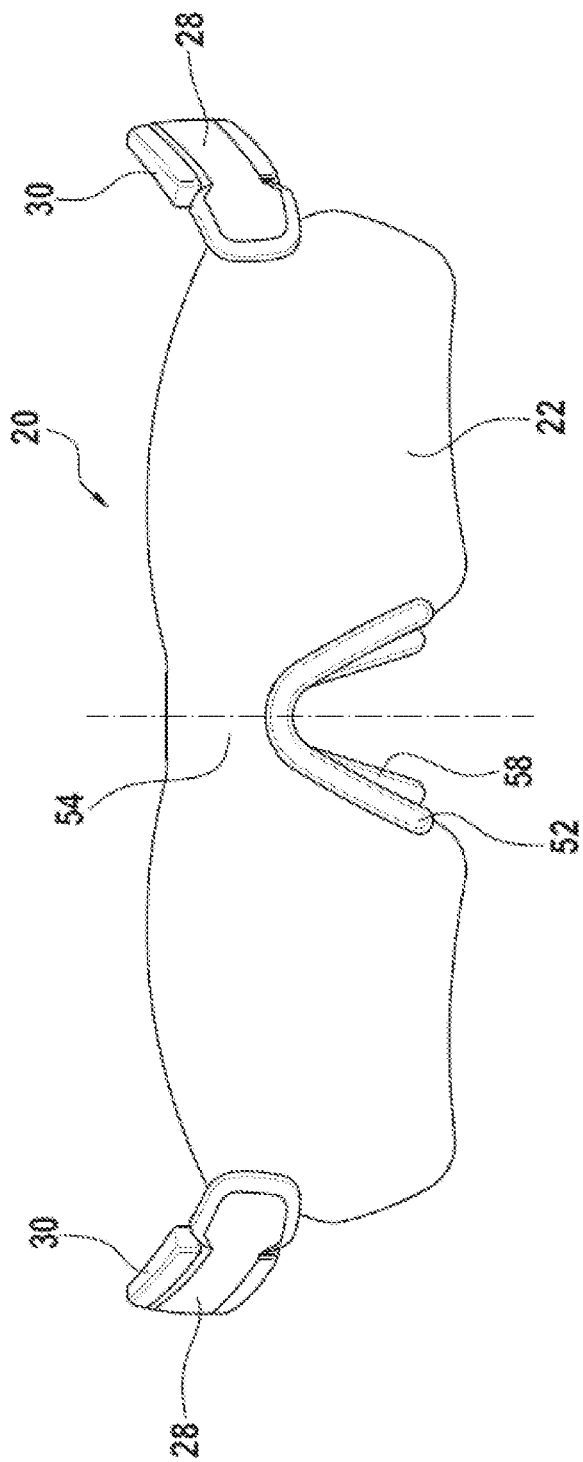
FIG. 4 shows a front view of the protective glasses according to FIG. 3.

The glasses arms 28 are angled in the direction of the lens panel 22 at the outer ends of the side pieces 24, 26, and therefore they are oriented essentially in a manner corresponding to the curvature of the lens panel 22 and follow the lens panel 22 tangentially, as can be seen in FIG. 3. In the case of the preferred embodiment illustrated, the lens panel 22 is curved in circular-arc form in the longitudinal direction and in the transverse direction in each case.

Each of the side pieces 24, 26 have their glasses arm 28 articulated on an upper outer end of the lens panel 22. Each of the glasses arms 28 are angled inward, at their points of articulation on the lens panel 22, by an angle of 30° to 35° in relation to a tangent 32 in each case to the point of articulation. This angle is designated by a in FIG. 3. The articulation axes of the side pieces 24, 26 on the lens panel 22 are designated by 34 and 36, respectively, in FIG. 3. It can clearly be seen that the articulation axes 34 and 36 are not aligned with one another.

Figure 5:
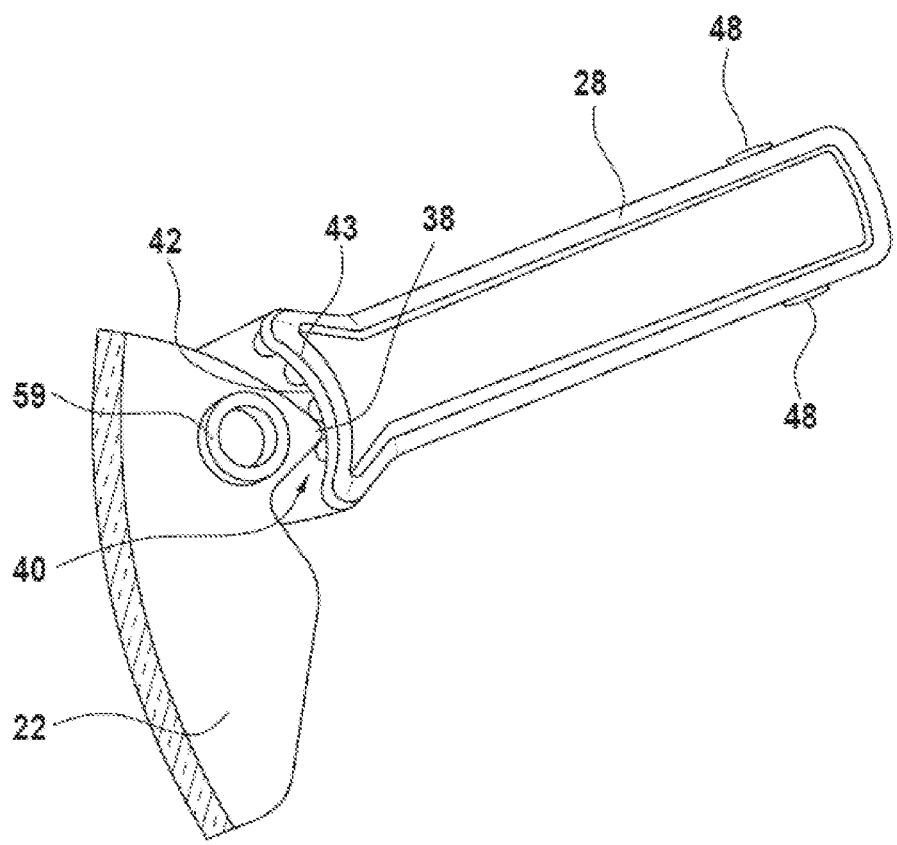
FIG. 5 shows a partial view of the protective glasses according to FIG. 3 as seen in the direction of an arrow V, although in this case a glasses-carrying arm has been omitted in order for a glasses arm to be shown over its entire length.
Figure 8:
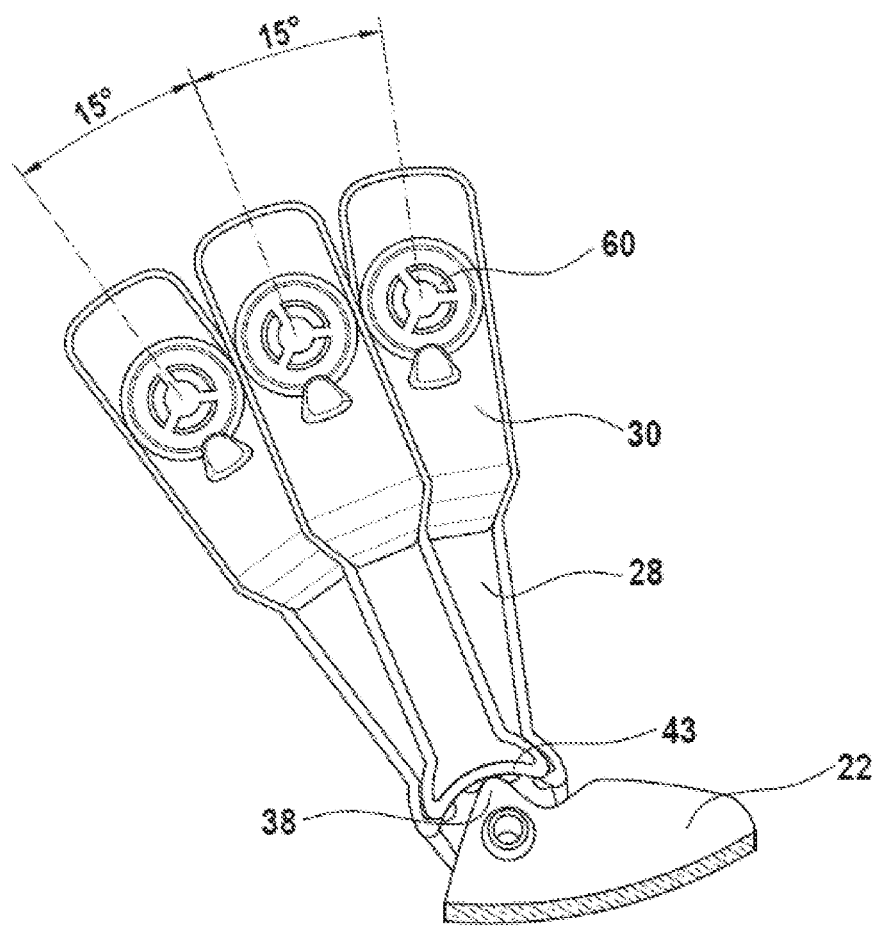
FIG. 8 shows the same partial view as in FIG. 5, but this time showing a glasses-carrying arm of the side piece, to be precise in three different tilting positions.

The side pieces 24, 26 can be hard-latched to the lens panel 22 in a form-fitting manner in a number of selectable positions. The wording "can be hard-latched in a form-fitting manner" has already been defined above in the introductory part of the description, and reference is made to this in order to avoid repetition. For this purpose, the lens panel 22 has formed on it, adjacent to each of the articulation axes 34, 36, a protrusion 38. Each protrusion 38 can be latched in a form-fitting and elastic manner to an adjacent ring 40 of depressions 42. Such a ring 40 is formed on each glasses arm 28, as can best be seen in FIG. 5. In the case of the preferred embodiment of the protective glasses 20 illustrated, each ring 40 has three depressions 42. The depressions 42 of each ring 40 are spaced apart from one another by an angle of 15°, as is shown in FIG. 8.

Figure 6A:
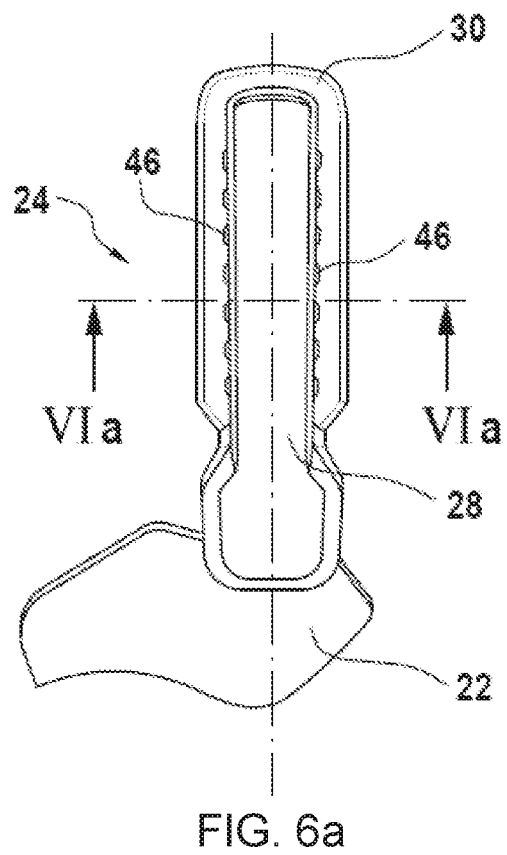
FIG. 6*a* shows a partial view of the protective glasses according to FIG. 3 as seen in the direction of an arrow VI in FIG. 3.
Figure 6B:
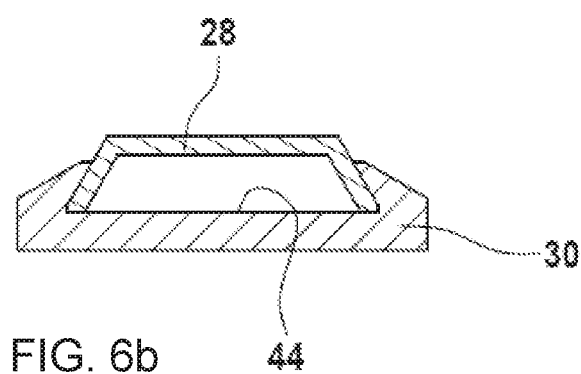
FIG. 6*b* shows a cross-sectional view taken along line VIa-VIa in FIG. 6.
Figure 7:
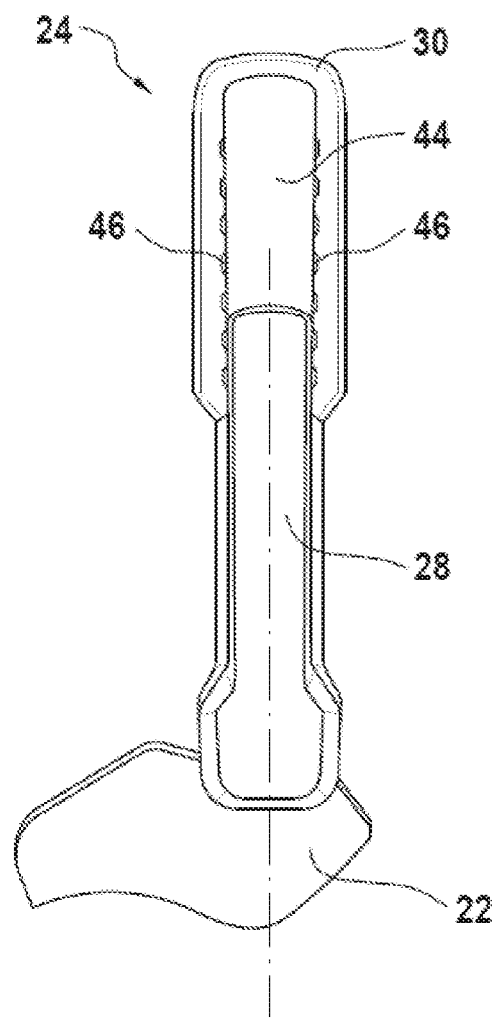
FIG. 7 shows a partial view of the protective glasses as in FIG. 6*a*, although a side piece of the protective glasses has been set to a greater side-piece length.

The glasses-carrying arm 30 of each side piece 24, 26 has a longitudinal groove 44, as can best be seen in FIG. 7. The longitudinal groove 44 forms a dovetail guide for the glasses arm 28 of each side piece 24, 26, this being shown as a detail in FIG. 6b, which illustrates a section taken along line VIa-VIa in FIG. 6a. The longitudinal groove 44 of each glasses-carrying arm 30 is open in a direction transverse to the longitudinal direction of said arm, as can readily be seen in FIG. 6b. Each glasses arm 28 consists of an elastically flexible material and has a cross-sectionally flat U profile, which is open in the direction of the other side piece 24 or 26. This ensures precise guidance of the glasses arm 28 in the glasses-carrying arm 30.

The glasses arms 28 can be arrested in a form-fitting and elastic manner on the glasses-carrying arms 30 in defined longitudinal positions. For this purpose, at the base of its cross-sectionally V-shaped lateral boundaries, the longitudinal groove 44 has depressions 46 which are arranged one behind the other in the longitudinal arm direction in each case, said depressions being shown in FIGS. 6a and 7. Each glasses arm 28 is provided with a pair of mutually opposite protrusions 48 (FIG. 5), which can be latched into a pair of mutually opposite depressions 46. It would also be possible, instead, for the arresting capability to be achieved by a friction fit between the glasses-carrying arm 30 and the glasses arm 28.

In a bridge region or central region 54, a rest for the bridge of the nose and the sides of the nose, said rest being designated as a whole by 50, is fitted on the lens panel 22. The rest 50 comprises a strip 52 which is made of plastics material and is designed to be thicker than the lens panel 22, in order to provide a relatively large bearing surface for the bridge of the nose. The strip 52 is essentially V-shaped and has an essentially U-shaped cross section, which accommodates a periphery of the lens panel 22 beneath the bridge region 54. In the region of the vertex of the V, the strip 52 has formed on its rear side a bracket 56, on which a nose-pad structure 58 is fastened. The nose-pad structure 58 is designed such that it comes into contact only with the sides of the nose. The strip 52 is designed such that, in the region of the vertex of the V, it comes into contact mainly with the bridge of the nose.

The glasses arm 28 and the glasses-carrying arm 30 of each side piece 24, 26 each consist of an elastic plastics material. The design is such that the glasses-carrying arms 30 are more flexurally rigid, and less elastic, than the glasses arms 28. The latter, as already explained above, are specifically designed such that, with the exception of the region of the ring 40, they can be twisted elastically.

Each glasses arm 28 has formed on it, in the region of its point of articulation on the lens panel 22, a stub 59, which is introduced into a corresponding bore in the lens panel and is wedged, or retained in some other captive fashion, therein.

Each glasses-carrying arm 30 has a stub 60 formed on its inner side, which is directed toward the head. Each stub 60 is slit axially at three locations spaced apart over its circumference, and it therefore comprises three resilient part-stubs, each having a radial protrusion on the outside at their outer or distal end. The stubs 60 formed in this way can each be clipped into a corresponding opening 74 (indicated by dashed lines in FIG. 13) in a headband 72 of a helmet 70. A protrusion 75 is integrally formed on the headband 72 alongside the opening 74. A corresponding protrusion 76 is integrally formed on the inner side of the glasses-carrying arm 30 alongside the stub 60. When the protective glasses 20 have been moved into the stowage position, the protrusion 76 rests on the protrusion 75, over which it has previously passed with elastic deformation. This ensures that the protective glasses 20 cannot accidentally leave the stowage position.

Figure 9:
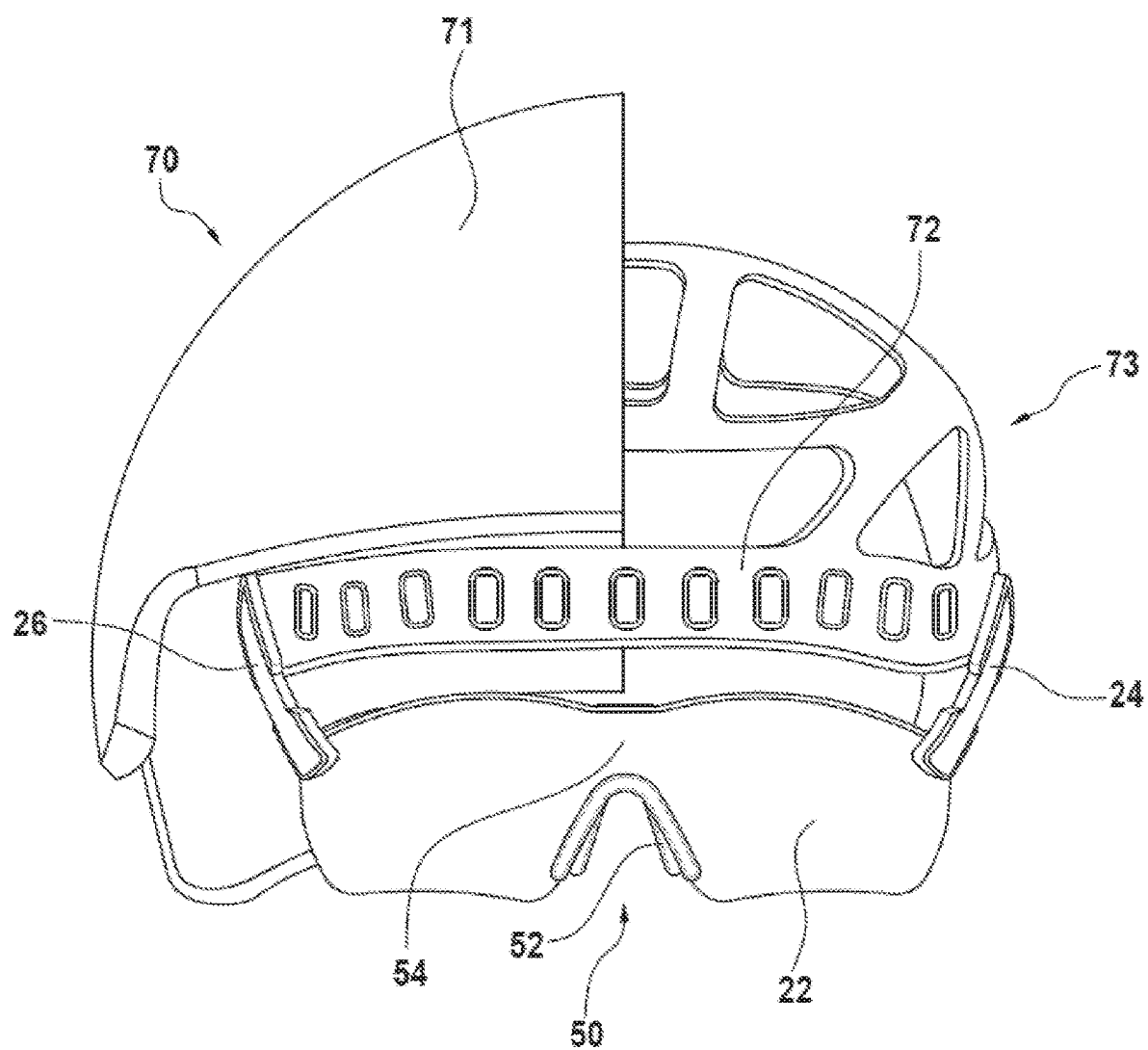
FIG. 9 shows a front view of a protective helmet according to the invention equipped with protective glasses according to FIGS. 1 to 8 and illustrated with half of it cut away, wherein the protective glasses are shown as having been swung downward into a protective position.

FIG. 9 shows a front view of the protective helmet 70 equipped with the protective glasses 20 and illustrated with half of the helmet shell 71 cut away, wherein the protective glasses 20 are shown as having been swung downward into a protective position, in which the lens panel 22 is arranged in front of the eyes and protects the same.

Figure 10:
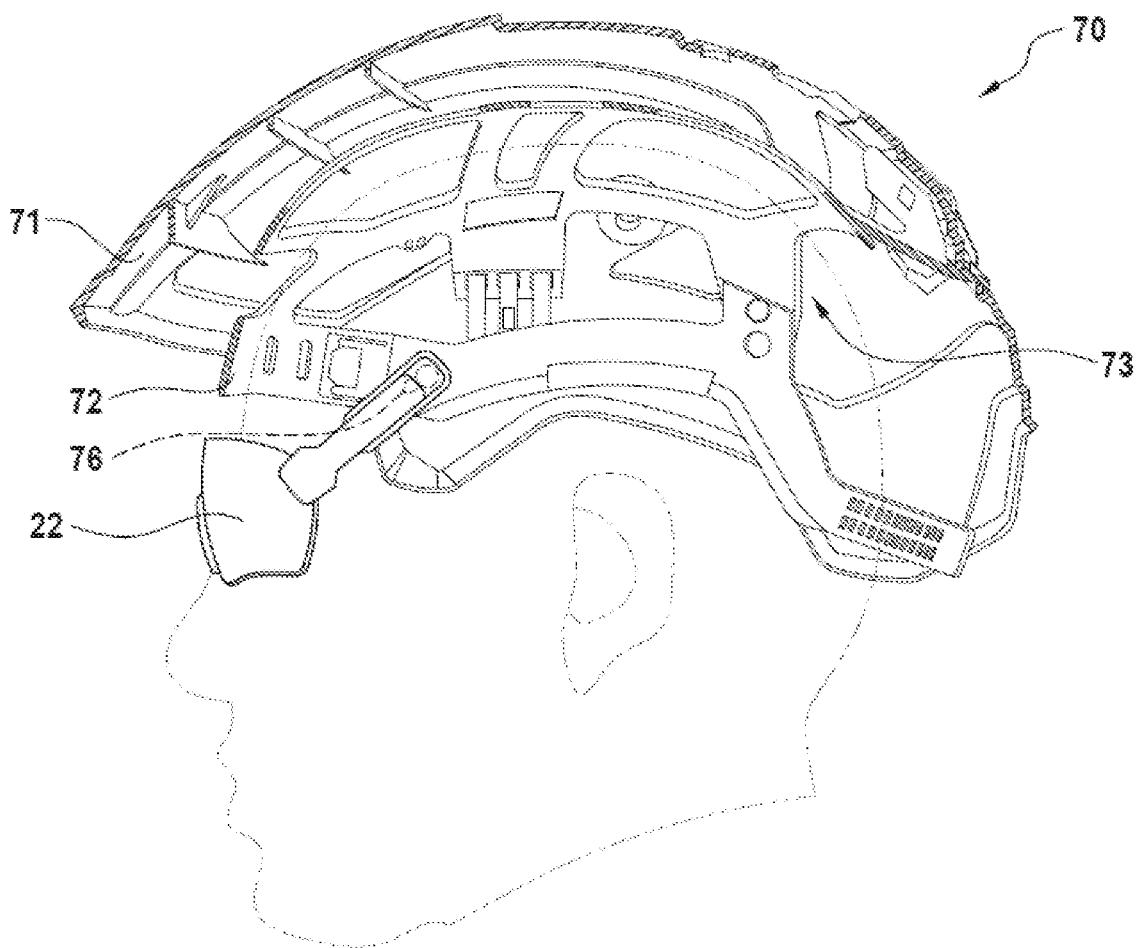
FIG. 10 shows the protective helmet according to FIG. 9 as seen from the right.

FIG. 10 shows the protective helmet 70 according to FIG. 9 as seen from the right.

Figure 11:
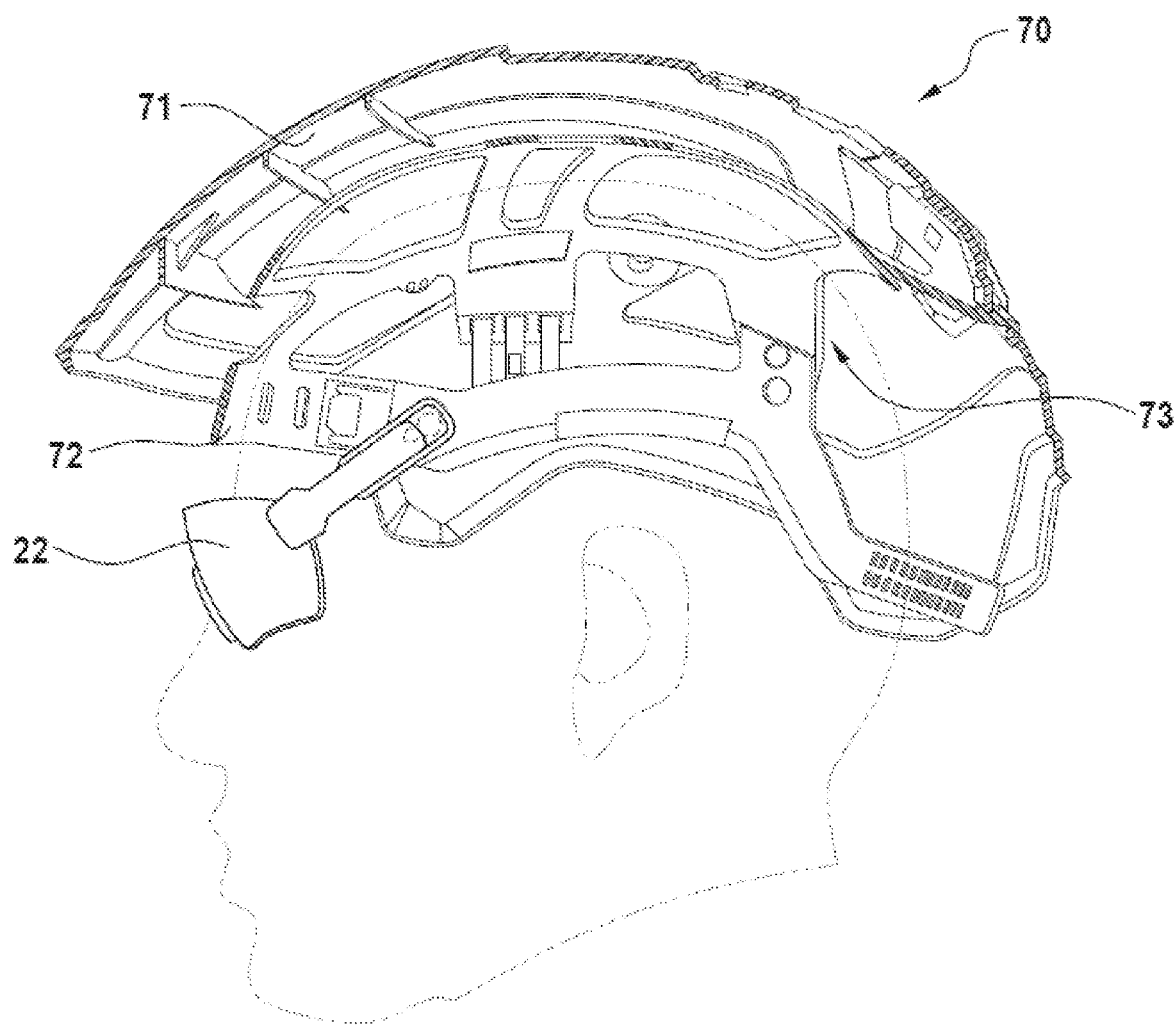
FIG. 11 shows the protective helmet according to FIG. 9 likewise as seen from the right, although the protective glasses here are shown with their lens panel in a different tilting position.

FIG. 11 shows the protective helmet 70 according to FIG. 9 likewise as seen from the right, although the protective glasses 20 here are shown with their lens panel 22 in a different tilting position.

FIG. 12 shows the protective helmet 70 in an equal view as in FIG. 9, but wherein the protective glasses 20 together with their lens panel 22 are shown as being swung upward into a stowage position.

FIG. 13 shows the protective helmet 70 according to FIG. 12 in a view from the right side.

Figure 14:
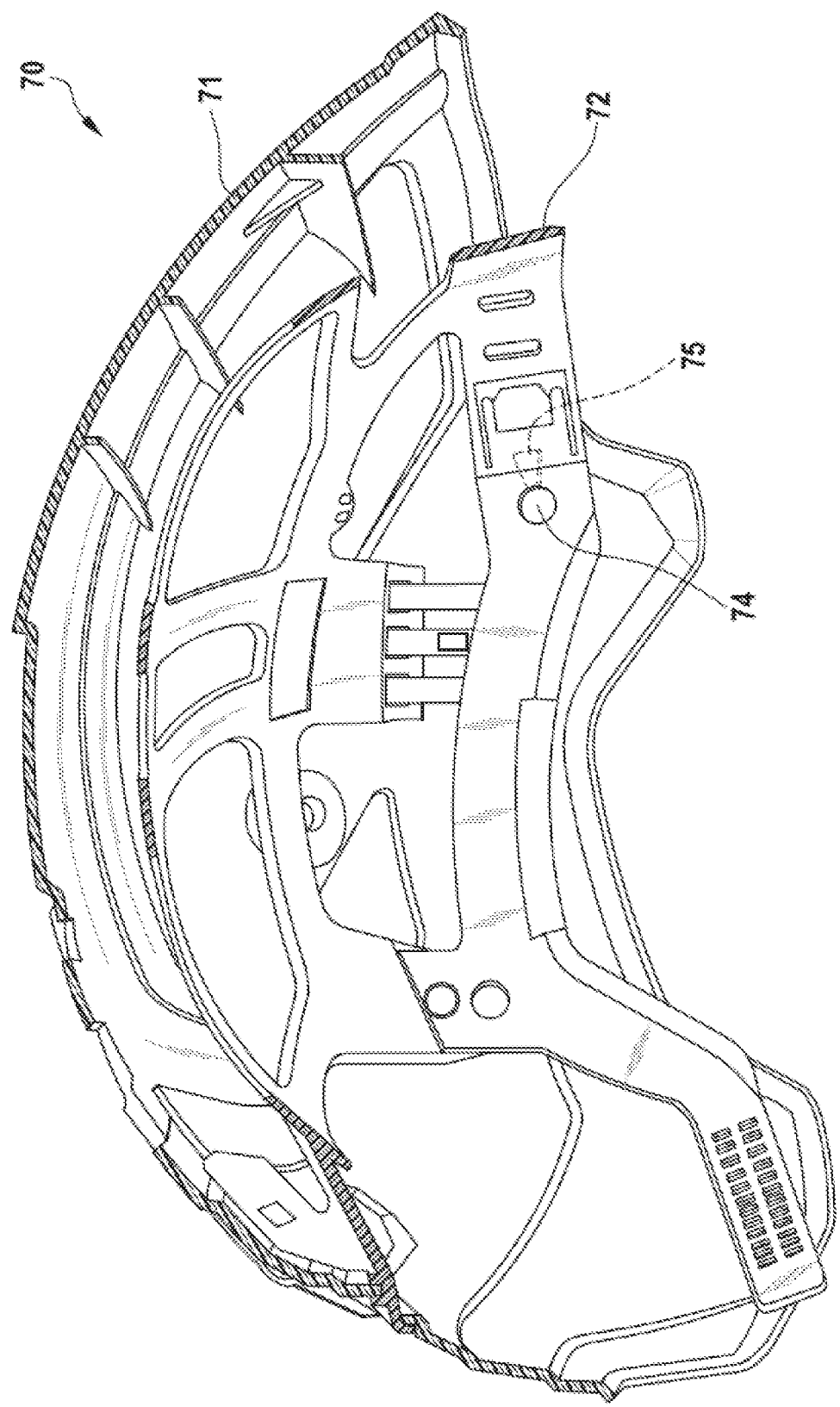
FIG. 14 shows the protective helmet according to the present invention in a side view wherein the protective glasses have been omitted.

FIG. 14 shows the protective helmet 70 in a side view wherein the protective glasses 20 have been omitted.

The tilting position selected is a question not just of the shape of the face or the head, but also, for example, of ventilation, which can be optimized or reduced by the tilting position, depending on how much the lens panel 22 is tilted and on the direction of the tilting position. Optimization of protection may reside, for example, in that, when particles produced by grinding are flying from top to bottom in the direction of the eyes, the direction of protection can be adapted by the tilting position. The relatively hard latching here does not constitute a problem because the tilting position is reset normally relatively infrequently.

LIST OF REFERENCE SIGNS

20 Protective glasses
22 Lens panel
24 Side piece
26 Side piece
28 Glasses arm
30 Glasses-carrying arm
32 Tangent
34 Articulation axis
36 Articulation axis
38 Protrusion
40 Ring
42 Depression
43 Rib
44 Longitudinal groove
46 Depression
48 Protrusion
50 Rest
52 Strip
54 Bridge region
56 Bracket
58 Nose-pad structure
59 Stub
60 Stub
70 Helmet
71 Helmet shell
72 Headband
73 Interior arrangement
74 Opening
75 Protrusion
76 Protrusion
α Angle

What is claimed is:

1. Protective glasses for a user, the glasses configured to fit on a protective helmet worn by the user during industry and forestry work in a protective position of the glasses, the glasses also being configured to be stowed as a whole within the helmet in a stowage position of the glasses, the glasses comprising:
 a lens panel for protecting eyes of the user, the lens panel comprising a longitudinally continuously curved shape, which is a circular-arc in a longitudinal direction, the lens panel configured to move from the protective position to the stowage position, the protective position being in front of the eyes of the user when wearing the helmet, the stowage position of the glasses as a whole being within the helmet when the user is wearing the helmet;
 a first side piece and a second side piece, each side piece comprising an inner end for articulating on the helmet at a first point of articulation and an outer end for articulating on the lens panel at a second point of articulation, each second point of articulation defining a respective articulation axis about which the respective side piece is configured to respectively rotate relative to the lens panel, and each side piece comprising a first arm and a second arm, the first arm receivable in the second arm or the second arm receivable in the first arm, the first arm and the second arm displacing telescopically relative to each other to adjust a length of the respective side piece, the first arm and the second arm comprising a form fit or a friction fit to prevent mutual displacement or any change in lengths of the side pieces, when the protective glasses as a whole are moved into and out of the stowage position;
 wherein each respective first arm comprises the respective outer end, each respective first arm being tangential to the lens panel at the respective outer end; each of the side pieces having a respective one of the glasses arms articulated on an upper outer end of the lens panel at the second point of articulation;
 wherein each respective first arm comprises the respective articulation axis at the respective outer end, the two articulation axes not being aligned with one another such that the two articulation axes intersect one another at a point rearward of the lens panel;
 wherein the side pieces are hard-latched to the lens panel in a form-fitting and elastic manner; such that the protective glasses are configured to be moved between the protective position and the stowage position by the user using one hand, without the lens panel changing position in relation to the side pieces during the change in positions, wherein the lens panel is configured to be fixed in one of a plurality of user-selected tilting positions before the helmet is worn on a head of the user.

2. The protective glasses as claimed in claim 1, wherein each of the first arms is angled inward at the respective first point of articulation on the lens panel by an angle of 30°-35° relative to a tangent to each respective first point of articulation.

3. The protective glasses as claimed in claim 1,
 wherein each first arm comprises a ring having a plurality of depressions;
 wherein for each side piece, the lens panel comprises a protrusion adjacent to the articulation axis of the respective side piece;
 wherein the respective side piece is hard-latched in form-fitting and elastic manner to the ring.

4. The protective glasses as claimed in claim 3, wherein each ring comprises at least three depressions.

5. The protective glasses as claimed in claim 3, wherein each side piece is recessed by an amount equal to a thickness of the lens panel in a first region, the first region comprising an area around the respective articulation axis and at least up to the ring.

6. The protective glasses as claimed in claim 5, wherein each first arm comprises an elastically flexible material and comprises a flat U profile in cross-section, the U profile being open in a direction toward the other side piece.

7. The protective glasses as claimed in claim 6,
 wherein each U shape comprises a first leg and a second leg;
 wherein each first arm comprises a rib integrally formed on the respective first arm;
 wherein each rib connects the first leg and the second leg in a region of the first point of articulation; and
 wherein the ring is formed on the rib.

8. The protective glasses as claimed in claim 1, wherein each inner end comprises a stub, the stub for articulating the respective side piece on the helmet and for latching the respective side piece in a friction-fitting or formfitting manner in the stowage position of the protective glasses.

9. The protective glasses as claimed in claim 1, wherein each second arm comprises a longitudinal groove, the groove being a dovetail guide for the respective second arm.

10. The protective glasses as claimed in claim 9, wherein each longitudinal groove is open in a direction transverse to a longitudinal direction of the respective second arm.

11. The protective glasses as claimed in claim 1, the first arm being held in a form-fitting and elastic manner on the second arm in a plurality of defined longitudinal positions.

12. The protective glasses as claimed in claim 1,
wherein the lens panel comprises a lens bridge, a rest for a bridge of a nose of the user or a rest for a side of the nose or the sides of the nose.

13. The protective glasses as claimed in claim 1, wherein the first side piece comprises a mirror-inverted shape of the second side piece.

14. A protective helmet assembly configured to be worn during industry and forestry work, the helmet assembly comprising:
a protective helmet;
protective glasses for a user, the glasses configured to fit on the protective helmet in a protective position, the glasses also being configured to be stowed as a whole within the helmet in a stowage position, the glasses comprising:
a lens panel for protecting eyes of the user, the lens panel comprising a longitudinally continuously curved shape, which is a circular-arc in a longitudinal direction, the lens panel configured to move from the protective position to the stowage position, the protective position being in front of the eyes of the user when wearing the helmet, the stowage position of the glasses as a whole being within the helmet when the user is wearing the helmet;
a first side piece and a second side piece, each side piece comprising an inner end for articulating on the helmet at a first point of articulation and an outer end for articulating on the lens panel at a second point of articulation, each second point of articulation defining a respective articulation axis about which the respective side piece is configured to respectively rotate relative to the lens panel, and each side piece comprising a first arm and a second arm, the first arm receivable in the second arm or the second arm receivable in the first arm, the first arm and the second arm displacing telescopically relative to each other to adjust a length of the respective side piece, the first arm and the second arm comprising a form fit or a friction fit to prevent mutual displacement or any change in lengths of the side pieces, when the protective glasses as a whole are moved into and out of the stowage position;
wherein each respective first arm comprises the respective outer end, each respective first arm being tangential to the lens panel at the respective outer end; each of the side pieces having a respective one of the glasses arms articulated on an upper outer end of the lens panel at the second point of articulation;
wherein each respective first arm comprises the respective articulation axis at the respective outer end, the two articulation axes not being aligned with one another such that the two articulation axes intersect one another at a point rearward of the lens panel;
wherein the side pieces are hard-latched to the lens panel in a form-fitting and elastic manner; such that the protective glasses are configured to be moved between the protective position and the stowage position by the user using one hand, without the lens panel changing position in relation to the side pieces during the change in positions, wherein the lens panel is configured to be fixed in one of a plurality of user-selected tilting positions before the helmet is worn on a head of the user.

15. The protective helmet as claimed in claim 14, further comprising
a helmet shell, and
an interior arrangement disposed inside the helmet shell;
wherein the interior arrangement comprises a stowage space in a front region of the helmet, the stowage space for holding the protective glasses as a whole when in the stowage position.

16. The protective helmet as claimed in claim 15,
wherein the interior arrangement comprises a headband, the headband comprising a plurality of openings for articulation of the first side piece and the second side piece,
wherein the plurality of openings permit the protective glasses to be moved from the stowage position without adjusting the respective length of the first side piece or the second side piece,
wherein a first protrusion is integrally formed on the headband alongside the opening, a corresponding second protrusion is integrally formed on the inner side of the second arm alongside the stub, so that when the protective glasses have been moved into the stowage position, the second protrusion rests on the first protrusion, over which it has previously passed with elastic deformation, to ensure that the protective glasses cannot accidentally leave the stowage position.

* * * * *